(12) United States Patent  (10) Patent No.: US 8,701,380 B2
Vuillemin  (45) Date of Patent: Apr. 22, 2014

(54) TURBINE ENGINE WITH NONSTREAMLINED IMPELLERS

(75) Inventor: Alexandre Alfred Gaston Vuillemin, Fontainebleau (FR)

(73) Assignee: SNECMA, Paris (FR)

(*) Notice: Subject to any disclaimer, the term of this patent is extended or adjusted under 35 U.S.C. 154(b) by 271 days.

(21) Appl. No.: 13/175,321

(22) Filed: Jul. 1, 2011

(65) Prior Publication Data

US 2012/0000177 A1  Jan. 5, 2012

(30) Foreign Application Priority Data

Jul. 5, 2010 (FR) ...................................... 10 55448

(51) Int. Cl.

| F02C 1/06 | (2006.01) |
| F02C 3/10 | (2006.01) |
| F02C 6/00 | (2006.01) |
| F02G 1/00 | (2006.01) |
| F02G 3/00 | (2006.01) |

(52) U.S. Cl.
USPC .................... 60/39.162; 60/39.15; 60/39.163; 60/268

(58) Field of Classification Search
USPC ...................... 60/39.15, 39.162, 39.163, 268; 60/226.1–226.3; 244/53 R; 416/1, 129, 416/142, 147–172
See application file for complete search history.

(56) References Cited

U.S. PATENT DOCUMENTS

| 3,957,229 | A | * | 5/1976 | Davis ........................... 244/53 R |
| 4,915,586 | A | * | 4/1990 | Williams ........................ 416/89 |
| 4,936,526 | A | * | 6/1990 | Gries .............................. 244/69 |
| 4,979,876 | A | | 12/1990 | Chapman |
| 5,174,716 | A | * | 12/1992 | Hora et al. ...................... 416/26 |
| 5,186,609 | A | * | 2/1993 | Inoue et al. .................... 416/129 |
| 5,282,719 | A | * | 2/1994 | McCarty et al. ................. 416/1 |
| 5,441,388 | A | * | 8/1995 | Berger .......................... 416/125 |
| 5,743,489 | A | | 4/1998 | Stemme |

FOREIGN PATENT DOCUMENTS

DE  44 20 219 A 1  12/1995

OTHER PUBLICATIONS

Preliminary Search Report issued Jan. 4, 2011 in France Application No. 1055448, filed Jul. 5, 2010 (With English Translation of Category of Cited Documents).

* cited by examiner

*Primary Examiner* — Gerald L Sung
*Assistant Examiner* — Craig Kim
(74) *Attorney, Agent, or Firm* — Oblon, Spivak, McClelland, Maier & Neustadt, L.L.P.

(57) ABSTRACT

A turbine engine including two respectively upstream and downstream external impellers that are nonstreamlined, coaxial, and contrarotating is provided. The downstream impeller is retractable so as to reduce its diameter. The blades of the downstream impeller are mounted so as to pivot about a pivot, the axis of which forms a nonzero angle, notably perpendicular, with the axis of rotation of the impeller, the blades in the retracted position being tilted about the pivot.

8 Claims, 2 Drawing Sheets

TURBINE ENGINE WITH NONSTREAMLINED IMPELLERS

The present invention relates to the field of aircraft turbine engines with nonstreamlined dual impellers.

BACKGROUND OF THE INVENTION

An engine of this type, designated in the present field by the terms "open rotor" or "unducted fan" comprises a gas turbine engine feeding a free turbine with contrarotating coaxial rotors each associated with an impeller. The two impellers extend substantially radially to the outside of the nacelle of the turbine engine and are themselves coaxial and contrarotating. The drive of the two impellers is either direct, the two impellers are mounted on the periphery of the two turbine rotors, or by means of a mechanical gearbox, the two impellers each being connected to an output of the gearbox.

Turbine engines with nonstreamlined impellers are currently being studied because they have the advantage of being powerful by being capable of supplying a considerable thrust and of consuming less fuel than other equivalent turbojets with streamlined fan.

However, the high noise levels generated by the mechanisms of aerodynamic interaction between the two impellers are a drawback for this type of propulsion.

One of the sources of this noise arises from the interaction of vortexes generated at the tips of the blades of the upstream impeller, with the blades of the downstream impeller. The vortex generated by the upstream impeller interacts with the downstream impeller extremely energetically which generates high noise levels.

Ways of reducing the impeller noise are aimed at controlling the flows around the profiles; these means are not mature in the current state of the art.

One solution for suppressing this noise consists in reducing the external diameter of the downstream impeller so that the vortices generated by the upstream impeller pass outside the envelope of the downstream impeller and do not interact with the latter. Such a solution is unsatisfactory because it results in a reduction in the thrust produced by the downstream impeller and therefore in a reduction in the performance of the engine. It would be possible to increase the load of the downstream impeller in order to compensate for the reduction in its diameter but this would also increase the aeromechanical difficulty of the design of the pair of impellers and it would become extremely complex and difficult to achieve.

SUMMARY OF THE INVENTION

The object of the invention is therefore to reduce the noise levels generated by the impellers in order, in particular, to comply with the relatively strict acoustic certification standards that apply to the take-off and landing phases of the aircraft fitted with this engine.

Another object is to provide good aerodynamic performance at cruising speed.

These objects are achieved according to the invention with a turbine engine comprising two respectively upstream and downstream external impellers that are nonstreamlined, coaxial and contrarotating, wherein the downstream impeller is retractable so as to reduce its diameter and the mechanism for actuating the downstream impeller in the retracted position comprises a brake for braking the rotation of the rotor and a means for actuating the blades into a retracted position.

By means of the invention, the diameter of the downstream impeller is reduced sufficiently for it not to see the vortexes in the phases in which it is desired to attenuate the engine noise, that is to say during take-off and landing of the aircraft. The downstream impeller is retracted preferably sufficiently so that, during these phases in the vicinity of airports, only one impeller is in use. In this manner, the totality of the interactions is suppressed.

The blades of the downstream impeller are mounted so as to pivot about a pivot, the axis of which forms a nonzero angle with the axis of rotation of the impeller, the blades in the retracted position being tilted about the pivot. Advantageously, the axis of the pivot is perpendicular to the axis of rotation of the impeller. In the latter case, the blades can be placed along the nacelle while reducing drag.

The impeller is braked until it stops rotating in order to make the retraction easier.

According to one feature, the actuation mechanism comprises a means for compensating for the braking of the downstream impeller with an acceleration of the upstream impeller. Such an arrangement makes it possible to maintain the power of the rotor in an awkward phase of the flight.

The actuation means comprises for example springs acting in opposition to the centrifugal force or else cylinders.

According to a preferred embodiment, the brake is arranged between the turbine rotor driving the downstream impeller and the shaft of the downstream impeller so as to reduce the rotation speed of the impeller relative to the rotation speed of the turbine rotor. More particularly, the downstream impeller is driven by means of an epicyclic gear train. The gear train may drive both impellers. Thus the epicyclic gear train comprises planet gears mounted on a planet carrier between a ring gear and a central gear, the downstream impeller being driven by the planet gears and the brake being arranged to brake the rotation of the planet carrier. The upstream impeller is connected to said ring gear so as to be rotated by the ring gear.

BRIEF DESCRIPTION OF THE DRAWINGS

The invention is now described in greater detail without the description being limiting, with the aid of the appended drawings in which.

DESCRIPTION OF THE PREFERRED EMBODIMENTS

Figure 1:
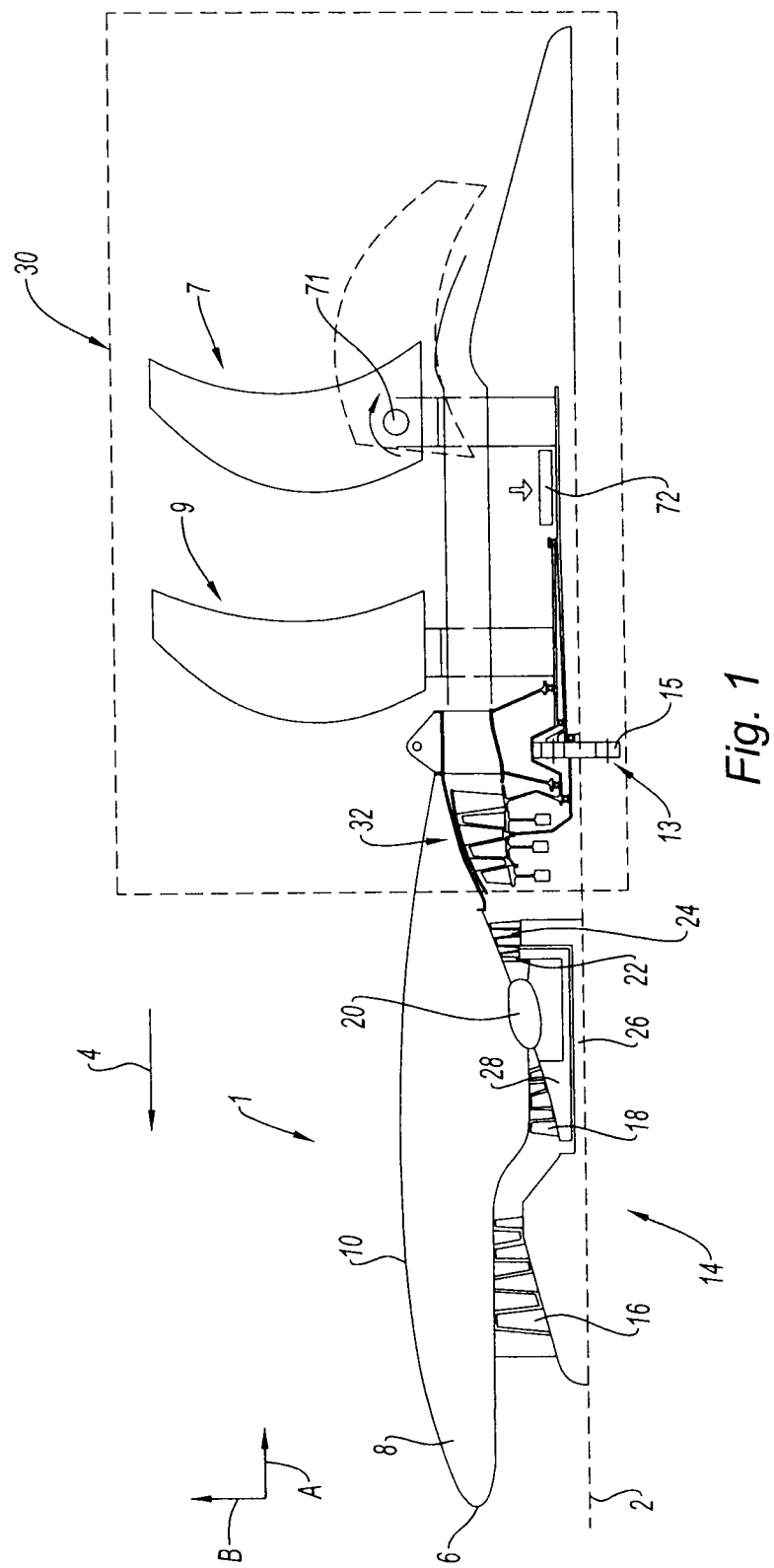
FIG. 1 represents in axial section the diagram of a turbine engine with nonstreamlined dual impellers.

With reference to FIG. 1, it shows a turbine engine 1 of the "open rotor" type, according to a preferred embodiment of the present invention.

In the figures, the direction A corresponds to the longitudinal direction or axial direction, parallel to the longitudinal direction 2 of the turbine engine. The direction B corresponds for its part to the radial direction of the turbine engine. Moreover, the arrow 4 schematizes the direction of travel of the aircraft under the action of the thrust of the turbine engine 1, this direction of travel being opposite to the main direction of flow of the gases within the engine. The terms "front", "upstream", "rear", "downstream" used in the reset of the description are to be considered with respect to said direction of travel 4.

In the front portion, the turbine engine has an air inlet 6 continuing toward the rear through a nacelle 8, the latter comprising in general an external casing 10 centered on the axis 2.

The turbine engine comprises a gas generator 14 consisting of a gas turbine engine. The latter in this instance is a twin-spool engine with a low-pressure compressor 16, a high-pressure compressor 18, a combustion chamber 20, a high-pressure turbine 22, and an intermediate-pressure turbine 24. The compressor 16 and the turbine 24 are mechanically connected by a shaft 26, thus forming a first low-pressure spool, while the compressor 18 and the turbine 22 are mechanically connected by a drum 28, forming a higher-pressure spool.

Downstream of the turbine 24, there is a system of contrarotating impellers 30, forming a receiver of the gas generator.

This system 30 comprises a free power turbine 32, which forms a low-pressure turbine, and which has the particular feature of being contrarotating. Specifically, with reference more precisely to FIG. 2, it comprises a first rotor 32a forming the internal rotor of the contrarotating turbine, and a second rotor 32b forming the external rotor of this turbine.

The impeller system 30 comprises a stator or housing 34, centered on the longitudinal axis 2 of the system, and enclosing notably said free power turbine 32. This stator 34 is, in a known manner, designed to be secured to the other housings of the turbine engine. In this respect, it is indicated that the impeller system 30 is preferably designed so that the impellers have no external radial streamlining surrounding them, as can be seen in the figures.

Moreover, downstream of the contrarotating turbine 32, the impeller system 30 incorporates a first impeller 7 or downstream impeller, supporting blades 7a. Similarly, the system 30 comprises a second impeller 9 or upstream impeller, supporting blades 9a. Thus, the impellers 7, 9 are offset relative to one another in the direction 4, and both are situated downstream of the free turbine 32.

The two impellers 7, 9 are designed to rotate in opposite directions about the axis 2 on which they are centered, the rotations taking place relative to the stator 34 remaining immobile.

According to the invention, provision is made to allow the retraction of the downstream impeller 7 for the purpose of reducing the noise emitted by the interaction of the upstream impeller on the downstream impeller. Shown in FIG. 1 are the two possible configurations of the downstream impeller. The blades of the downstream impeller are each mounted on a pivot 71 with its axis perpendicular to the axis of rotation 2, and are articulated about the latter so as to be able to take a deployed position in the transverse plane and a retracted position in the downstream direction along the nacelle. In the latter position, with a blade shown in dashed lines, the diameter of the impeller is thus reduced. Therefore, the current lines travel along the blade tip and give rise to blade-tip vortexes on the upstream impeller. When the downstream impeller is in the retracted position, the impact of these vortexes on the downstream impeller and the source of noise are prevented.

In cruising configuration, during which it is not necessary to attenuate the noise of the impellers and which corresponds to more than 90% of the mission, the two impellers are deployed; in particular, the blades of the downstream impeller 7 extend in a radial direction relative to the axis of the engine. It is on take-off or on landing that the retracted position of the downstream impeller is activated and that generally represents only 10% of the mission.

Various mechanisms allow the retraction of the downstream impeller. One means of actuating the blades into the retracted position includes for example spring means, not shown, which exert a force for tilting the blades about their pivot 71 in the downstream direction. These spring means are advantageously associated with a braking means 72 for braking the downstream impeller in order to form the mechanism for actuating the downstream impeller into the retracted position. In this manner, when the brake is actuated, the spring means exceed the centrifugal forces applied to the blades, which causes them to tilt in the downstream direction.

The spring means may be reinforced by cylinders or any other equivalent means, exerting a rotational torque on the blade. According to another embodiment, the latter may even replace them.

According to the embodiment shown here, the braking means 72 acts on the shaft 29 for driving the impeller 7.

The mode for driving the impellers according to this embodiment is not direct but is done via a gear mechanism such as a speed-reduction box and more particularly by means of an epicyclic gear mechanism.

Figure 2:
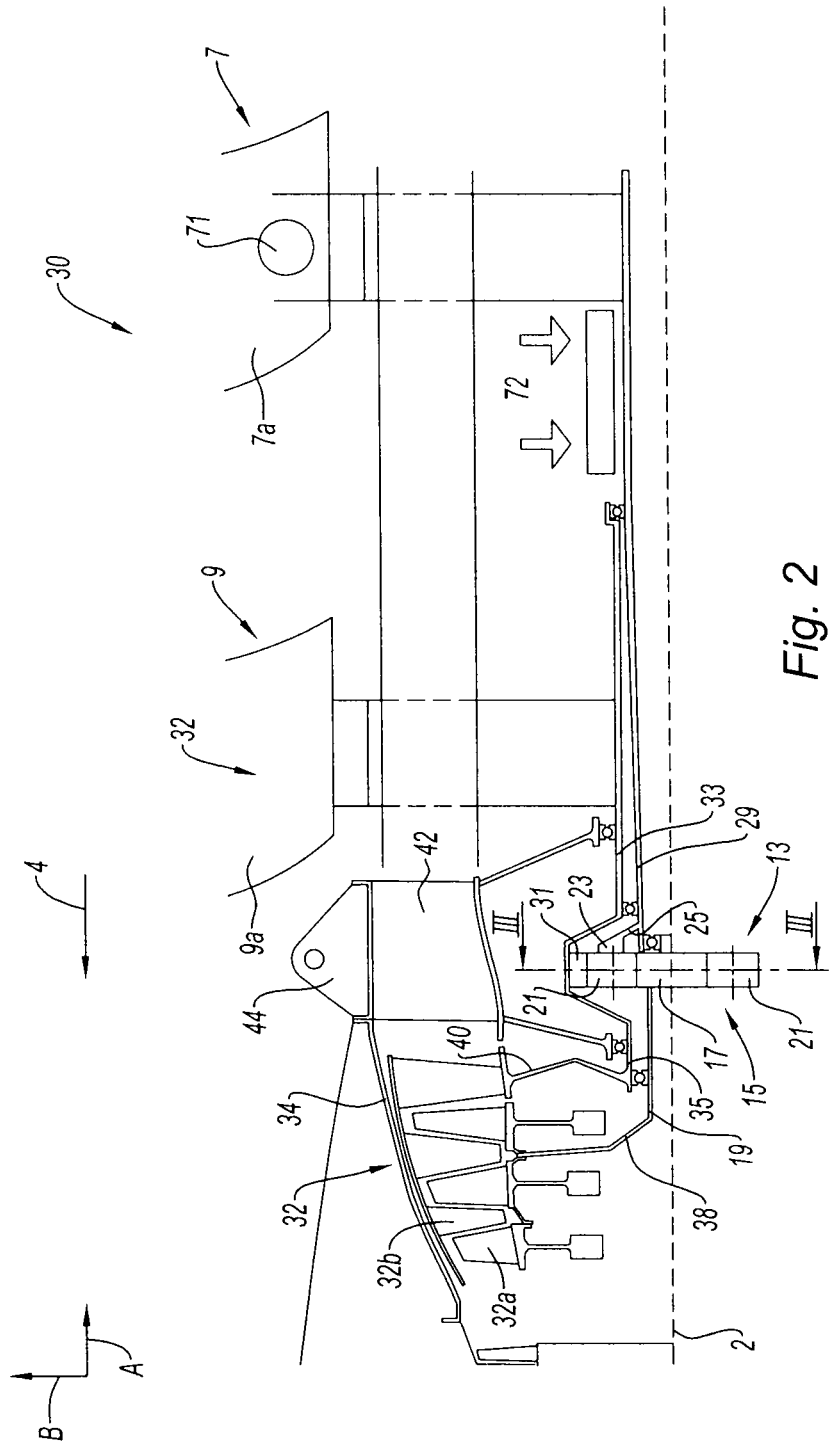
FIG. 2 shows the engine of FIG. 1 with the transmission via an epicyclic gear train.

With reference to FIG. 2, for the rotation of these two impellers 7, 9, a transmission device 13 is provided, forming a reduction gear and notably comprising an epicyclic gear train 15. Such a drive by epicyclic gear train is described in the patent application in the name of Snecma FR200080058822, filed on 19 Dec. 2008.

The gear train 15 is furnished with a sun gear 17 centered on the longitudinal axis 2, and supported by a sun-gear shaft 19 with the same axis, securely connected in the upstream direction to the first rotor 32a via a flange 38. Therefore, the rotor 32a rotates the sun gear 17 directly, the latter taking the form of a gearwheel with external teeth.

The gear train 15 also comprises a planet gear 21, and preferably several as can be seen in FIG. 2, each of them meshing with the sun gear 17. Each planet gear 21 is supported by a planet-gear shaft 23 with an axis that is off center relative to the axis 2, and takes the form of a gearwheel with external teeth.

Moreover, the gear train 15 is fitted with a planet carrier 25 centered on the longitudinal axis 2 and supporting in a rotary manner each of the planet gears 21, by means of the shafts 23 respectively. The planet carrier 25 is supported by a planet-carrier shaft 29 with the same axis, secured to the first impeller 7, as can be seen in FIG. 2, so as to be able to rotate it directly.

Finally, the gear train 15 has a ring gear 31 centered on the axis 2 and supported by a ring-gear shaft 33 with the same axis, this ring gear 31 meshing with each planet gear 21. The shaft 33 extends in the downstream direction while being secured to the second impeller 9, so as to be able to rotate it directly. For example, this shaft 33 is situated around the planet-carrier shaft 29 with which it is concentric, as shown in the figures.

The ring gear 31, taking the form of a gearwheel with internal teeth, has the additional particular feature of also being supported by another ring-gear shaft 35, with the same axis, and extending for its part in the upstream direction. This ring-gear shaft 35, situated around the sun-gear shaft 19 with which it is concentric, is securely connected to the second rotor 32b, via a flange 40. Thus, the rotor 32b also participates directly in the driving of the ring gear 31, and therefore in the driving of the upstream impeller 9. This makes it possible to obtain a unitary ratio between the torques transmitted respectively to the downstream impeller 7 and to the upstream impeller 9, in order to obtain a better output from the turbine engine.

When the braking means 72 is activated, the planet-gear carrier 25 no longer rotates about the sun gear 17 causing an increase in the rotation speed of the upstream impeller 9. This therefore compensates for the reduction in thrust resulting from the downstream impeller. In order to complete the device, the blades at least of the upstream impeller are variable-setting blades in order to optimize the performance of the latter.

Finally, it is noted that, in this preferred embodiment, in which each impeller is fitted with a system for the variable setting of its blades, the epicyclic gear train 15 is situated in line with and inside a housing 42 separating the contrarotating free power turbine 32 and the impellers 7, 9. This housing 42, also called the exhaust housing or else "static frame", supports an engine mount 44 designed to couple the turbine engine to the structure of the aircraft.

The invention claimed is:

1. A turbine engine comprising:
   a free power turbine including a first rotor and a second rotor which are contrarotating about an axis of the turbine engine;
   a first downstream external impeller and a second upstream external impeller disposed downstream of the free power turbine, the first and second impellers being non-streamlined, coaxial and contrarotating about the axis of the turbine engine, the first downstream impeller being retractable so as to reduce its diameter;
   a mechanism for actuating the first downstream impeller in a retracted position with a braking device which brakes rotation of the first downstream impeller and an actuating device which actuates blades of the first downstream impeller into the retracted position when the braking device is actuated; and
   an epicyclic gear train which drives the first and second impellers, the gear train including a sun gear comprising a gearwheel with external teeth and supported by a sun-gear shaft, a planet gear comprising a gearwheel with external teeth meshing with the sun gear and supported by a planet-gear shaft, a planet carrier which supports the planet gear in a rotary manner and includes a planet-carrier shaft, and a ring gear comprising a gearwheel with internal teeth meshing with the planet gear and supported by first and second ring-gear shafts,
   wherein the sun-gear shaft is connected to the first rotor, the planet-carrier shaft is secured to the first downstream impeller, the first ring-gear shaft is secured to the second upstream impeller, and the second ring-gear shaft is connected to the second rotor, and
   wherein the braking device is arranged to brake rotation of the planet-carrier shaft.

2. The turbine engine as claimed in claim 1, wherein the blades of the first downstream impeller are mounted so as to pivot about a pivot, the axis of the pivot presenting a nonzero angle with an axis of rotation of the first downstream impeller, the blades in the retracted position being tilted about the pivot.

3. The turbine engine as claimed in claim 1, wherein the epicyclic gear train compensates for the braking of the first downstream impeller with an acceleration of the second upstream impeller.

4. The turbine engine as claimed in claim 1, wherein the actuating device comprises springs acting in opposition to a centrifugal force.

5. The turbine engine as claimed in claim 1, wherein the actuating device comprises cylinders.

6. The turbine engine as claimed in claim 1, wherein the braking device is arranged between the free power turbine and the planet-carrier shaft secured to the first downstream impeller so as to reduce a rotation speed of the first downstream impeller relative to a rotation speed of the free power turbine.

7. The turbine engine as claimed in claim 1, wherein the second ring-gear shaft is securely connected to the second rotor via a flange.

8. The turbine engine as claimed in claim 2, wherein the axis of the pivot is perpendicular with the axis of rotation of the first downstream impeller.

* * * * *